(12) United States Patent
Kuriyama et al.

(10) Patent No.: US 6,833,107 B2
(45) Date of Patent: Dec. 21, 2004

(54) HEAT-TREATING FURNACE WITH MAGNETIC FIELD AND HEAT TREATMENT METHOD USING SAME

(75) Inventors: Yoshihiko Kuriyama, Saitama-ken (JP); Makoto Ushijima, Saitama-ken (JP); Yasuyuki Azuma, Kanagawa-ken (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 10/122,197

(22) Filed: Apr. 16, 2002

(65) Prior Publication Data
US 2002/0182557 A1 Dec. 5, 2002

(30) Foreign Application Priority Data
Apr. 17, 2001 (JP) ........................................ 2001-118623

(51) Int. Cl.[7] ................................................. C21D 1/74
(52) U.S. Cl. ........................................ 266/249; 219/411
(58) Field of Search .................... 266/249; 219/411, 219/390, 405

(56) References Cited
U.S. PATENT DOCUMENTS 4,169,962 A * 10/1979 Hiratke et al. .............. 219/411
6,303,908 B1   10/2001 Yamaga et al.

FOREIGN PATENT DOCUMENTS

JP          63300419 A  *  7/1988
JP          06-224027 A    12/1994

* cited by examiner

Primary Examiner—Scott Kastler
(74) Attorney, Agent, or Firm—Sughrue Mion, PLLC

(57) ABSTRACT

A heat-treating furnace with a magnetic field comprising (a) a magnetic field-generating means constituted by an outer, ring-shaped, permanent magnet assembly comprising a plurality of permanent magnet segments combined with their magnetization directions oriented such that a magnetic flux flows in a diameter direction, and an inner, ring-shaped, permanent magnet assembly disposed inside the outer, ring-shaped, permanent magnet assembly and comprising a plurality of permanent magnet segments combined with their magnetization directions oriented such that a magnetic flux flows in a diameter direction; and (b) a heat treatment means disposed in a center hole of the inner, ring-shaped, permanent magnet assembly and comprising a cooling means, a heating means, and a heat-treating container containing heat-treating holder for holding a plurality of articles to be heat-treated in this order from outside, wherein an axial center of a magnetic field generated by the inner and outer ring-shaped, permanent magnet assemblies is substantially identical with an axial center of an article assembly in the heat-treating container.

20 Claims, 12 Drawing Sheets

HEAT-TREATING FURNACE WITH MAGNETIC FIELD AND HEAT TREATMENT METHOD USING SAME

FIELD OF THE INVENTION

The present invention relates to a furnace for heat-treating wafer substrates for forming MR (magnetoresistive) heads, GMR (giant magnetoresistive) heads, MRAM (magnetic random access memory), etc. in a magnetic field in their production processes, and a heat treatment method using such a furnace.

PRIOR ART

A magnetic head generally has a structure in which a plurality of ferromagnetic layers are laminated on a substrate. For instance, the GMR head has a structure comprising non-magnetic insulating layers between ferromagnetic layers. The MRAM head has a structure comprising anti-ferro magnetic layers, a pinned magnetic layer, a non-magnetic conductive layer and free magnetic layers in this order from the side of a substrate. The pinned magnetic layers are entirely magnetized in one direction.

To magnetize the pinned layer in one direction, it is necessary to heat-treat or anneal a substrate provided with thin magnetic layers in a magnetic field. An oriented magnetic field of 0.5 T (tesla) or more is usually necessary to be applied, and an oriented magnetic field of more than 1.0 T is necessary depending on the materials of the pinned layer. To apply an oriented magnetic field to wafer substrates, a vacuum heat-treating furnace as shown in FIG. 15 has conventionally been used. This vacuum heat-treating furnace comprises a magnetic field-generating coil 113 equipped with a cooling pipe 112, a high-frequency coil 114 disposed inside the coil 113, and a vacuum container 106 for holding a plurality of wafer substrates 110 disposed inside the high-frequency coil 114.

However, the magnetic field-generating means in this heat-treating furnace with a magnetic field is constituted by an electromagnet having a coil, to which as large electric current as 500–800 A should be supplied to generate a magnetic field of 1.0 T or more, unsatisfactory from the aspect of safety. It also needs a facility for using large electric power, taking large electricity cost for generating a magnetic field, and a large amount of cooling water should be used to remove heat generated by large electric current. Because of these requirements, it suffers from high treatment cost. Further, because there is an extremely large leaked magnetic flux in the above structure, a large vacant space should be kept in addition to a facility space for the sake of safely, and the apparatus should be enclosed by a magnetic body such as iron, permalloy, etc. to prevent influence on ambient electronic equipment, taking the danger to human bodies into consideration.

With a superconductive coil, a magnetic field can be generated without using a large amount of electric power. Though the consumption of exciting current can be made smaller when a superconductive coil is used than when the electromagnet is used, liquid nitrogen or helium should always be consumed to keep superconductivity, resulting in high operation cost. Also, in a system using a superconductive coil, the variation of a magnetic field turns superconductivity to normal conductivity locally, resulting in heat generation in the coil, and if this state were left to stand, the superconductivity of the entire apparatus would be destroyed. Though the superconductive coil can generate as strong a magnetic field as several teslas to several tens of teslas, the range of a strong leaked magnetic field expands in proportion to its magnetic field strength like the electromagnet. Accordingly, it suffers from the problem of a leaked magnetic field like the electromagnet.

What can properly change a magnetic field strength without using exciting current is a Halbach-type magnetic circuit constituted by a combination of a plurality of permanent magnet segments having substantially the same magnetic force with different magnetization directions. For instance, see *Journal of Applied Physics*, Vol. 86, No. 11, Dec. 1, 1999, and *Journal of Applied Physics*, Vol. 64, No. 10, Nov. 15, 1988, and Japanese Patent Laid-Open No. 6-224027.

FIG. 16 shows one example of a Halbach-type magnetic circuit. The circular, Halbach-type magnetic circuit shown in FIG. 16 is constituted by an inner, ring-shaped, permanent magnet assembly 1 and an outer, ring-shaped, permanent magnet assembly 2, which are rotatable to each other. When the inner, ring-shaped, permanent magnet assembly 1 and the outer, ring-shaped, permanent magnet assembly 2 are at positions shown in FIG. 16(a), the magnetic field direction of the inner, ring-shaped, permanent magnet assembly 1 is the same as that of the outer, ring-shaped, permanent magnet assembly 2. Accordingly, there is a synthesized magnetic field having strength and direction shown by the arrow, which is formed by combining a magnetic field generated from the inner, ring-shaped, permanent magnet assembly 1 and a magnetic field generated from the outer, ring-shaped, permanent magnet assembly 2, in a center hole 20 of the inner, ring-shaped, permanent magnet assembly 1.

On the other hand, in a state as shown in FIG. 16(b) in which the outer, ring-shaped, permanent magnet assembly 2 has been rotated by 180° from the position of FIG. 16(a), the magnetic field generated from the magnetic circuit of the inner, ring-shaped, permanent magnet assembly 1 is offsetting the magnetic field generated from the magnetic circuit of the outer, ring-shaped, permanent magnet assembly 2 because of opposite magnetization directions. Accordingly, there is substantially no magnetic field in the center hole 20. Thus, the strength of the magnetic field can be adjusted from substantially zero to maximum by the rotation angle of both rings.

When the articles to be heat-treated are wafer substrates having magnetic resistance layers, as large a magnetic field as 1.0 T or more is usually needed to stably improve the magnetic resistance effect, and the magnetic field should be uniform and in parallel with the magnetization direction of the thin magnetic layers. However, a conventional heat-treating furnace comprising an electromagnet fails to generate a uniform magnetic field in parallel with the thin magnetic layers.

OBJECTS OF THE INVENTION

Accordingly, an object of the present invention is to provide a small, high-safety, high-accuracy, heat-treating furnace with a uniform parallel magnetic field and reduced magnetic field leakage.

Another object of the present invention is to provide a method for heat-treating articles in a magnetic field using such a heat-treating furnace.

SUMMARY OF THE INVENTION

The inventors have found that when a plurality of articles are heat-treated or annealed at a time in a magnetic field, permanent magnets can be used for a magnetic field-generating means by providing a cooling means around a means for heating the articles, and that by using a double-ring-type, Halbach-type magnetic circuit as the magnetic field-generating means, a high-accuracy, uniform parallel magnetic field can be applied to the articles in a radial direction during heat treatment. The present invention has been completed based on these findings.

The first heat-treating furnace with a magnetic field of the present invention comprises (a) a magnetic field-generating means constituted by one ring-shaped, permanent magnet assembly comprising a plurality of permanent magnet segments combined with their magnetization directions oriented such that a magnetic flux flows in a diameter direction; and (b) a heat treatment means disposed in a center hole of the ring-shaped, permanent magnet assembly and comprising a cooling means, a heating means, and a heat-treating container for containing heat-treating holder for holding a plurality of articles to be heat-treated in this order from outside.

The ring-shaped, permanent magnet assembly preferably has an inner diameter of 120 mm or more, an outer diameter of 300 mm or more, and an axial length of 100 mm or more. The ring-shaped, permanent magnet assembly has a shorter axial length as it goes outside in a radius direction.

Each permanent magnet segment constituting the ring-shaped, permanent magnet assembly has a residual magnetic flux density of 1.1 T or more and coercivity of 1114 kA/m (14 kOe) or more.

The axial length H and the outer diameter $D_1$ of the ring-shaped, permanent magnet assembly meet the requirement of $2 \leq D_1/H \leq 10$.

The second heat-treating furnace with a magnetic field of the present invention comprises (a) a magnetic field-generating means constituted by an outer, ring-shaped, permanent magnet assembly comprising a plurality of permanent magnet segments combined with their magnetization directions oriented such that a magnetic flux flows in a diameter direction, and an inner, ring-shaped, permanent magnet assembly disposed inside the outer, ring-shaped, permanent magnet assembly and comprising a plurality of permanent magnet segments combined with their magnetization directions oriented such that a magnetic flux flows in a diameter direction; and (b) a heat treatment means disposed in a center hole of the inner, ring-shaped, permanent magnet assembly and comprising a cooling means, a heating means, and a heat-treating container containing heat-treating holder for holding a plurality of articles to be heat-treated in this order from outside.

In the first and second heat-treating furnace with a magnetic field, the inside of the heat-treating furnace is preferably in vacuum, though the degree of vacuum is not restrictive. The heat-treating furnace may contain a small amount of an inert gas.

In the first and second heat-treating furnace with a magnetic field, the cooling means preferably comprises a cooling pipe through which a cooling liquid flows, and a heat sink plate disposed outside the cooling pipe and inside the inner, ring-shaped, permanent magnet assembly.

In the first and second heat-treating furnace with a magnetic field, an axial center of a magnetic field of the magnetic field-generating means is substantially identical with an axial center of an assembly of a plurality of articles to be heat-treated, which are held in the heat-treating container.

The inner, ring-shaped, permanent magnet assembly and the outer, ring-shaped, permanent magnet assembly are preferably rotatable relative to each other, and the articles to be heat-treated in the center hole and the inner, ring-shaped, permanent magnet assembly are preferably not changeable in their relative directions. Because the inner, ring-shaped, permanent magnet assembly and the outer, ring-shaped, permanent magnet assembly are rotatable relative to each other, a magnetic field in the center hole is changeable in a range of 0–2 T.

It is preferable that the inner, ring-shaped, permanent magnet assembly has an inner diameter of 120 mm or more, that the outer, ring-shaped, permanent magnet assembly has an outer diameter of 300 mm or more, and that the inner, ring-shaped, permanent magnet assembly or the outer, ring-shaped, permanent magnet assembly has an axial length of 100 mm or more.

In another preferred embodiment of the present invention, the inner, ring-shaped, permanent magnet assembly and the outer, ring-shaped, permanent magnet assembly have different axial lengths.

In a further preferred embodiment of the present invention, the inner, ring-shaped, permanent magnet assembly and/or the outer, ring-shaped, permanent magnet assembly have shorter axial length as it goes outside in a radius direction.

Each permanent magnet segment constituting the outer, ring-shaped, permanent magnet assembly and the inner, ring-shaped, permanent magnet assembly preferably has a residual magnetic flux density of 1.1 T or more and coercivity of 1114 kA/m (14 kOe) or more.

The axial length H of the inner, ring-shaped, permanent magnet assembly and the outer diameter $D_2$ of the outer, ring-shaped, permanent magnet assembly preferably meet the requirement of $2 \leq D_2/H \leq 10$.

The method for heat-treating a plurality of articles at a time in a magnetic field, using the above heat-treating furnace with a magnetic field, comprises the steps of (1) introducing a heat-treating holder, on which a plurality of the articles to be heat-treated are placed, into the heat-treating container at a relative rotation position of the inner, ring-shaped, permanent magnet assembly and the outer, ring-shaped, permanent magnet assembly at which a radial magnetic field is substantially zero in the center hole; (2) heat-treating the articles in the heat-treating container by the heating means while cooling the magnetic field-generating means by the cooling means, in a state where a predetermined magnetic field is caused to exist in the center hole by rotating the outer, ring-shaped, permanent magnet assembly relative to the inner, ring-shaped, permanent magnet assembly; and (3) after the completion of heat-treating the articles, taking a plurality of heat-treated articles out of the heat-treating container at a relative rotation position of the inner, ring-shaped, permanent magnet assembly and the outer, ring-shaped, permanent magnet assembly at which a radial magnetic field is substantially zero in the center hole.

The article to be heat-treated is preferably a wafer substrate having thin magnetic layer on the surface.

An assembly of the articles to be heat-treated is held in the heat-treating container, preferably at a position at which an axial center of an assembly of a plurality of articles being heat-treated is substantially identical with an axial center of a magnetic field of the magnetic field-generating means.

The heat treatment is carried out preferably when the heat-treating container is substantially in a vacuum state.

DESCRIPTION OF THE PREFERRED EMBODIMENTS

Figure 1A:
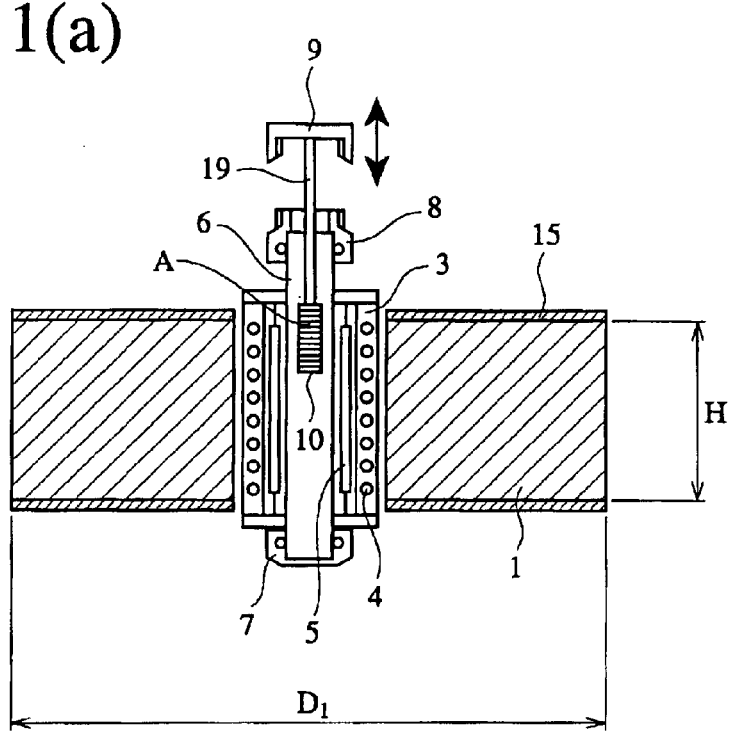
FIG. 1(a) is a vertical cross-sectional view showing one example of the first heat-treating furnace with a magnetic field of the present invention.

As shown in FIG. 1(a), the first heat-treating furnace with a magnetic field of the present invention comprises a heat treatment means comprising a heat-treating container 6 and a heating means 5, and a ring-shaped, permanent magnet assembly 1 disposed around the heat treatment means via a cooling means 3, whereby a uniform magnetic field can stably be generated in one direction in a horizontal plane at a low cost.

Figure 1B:
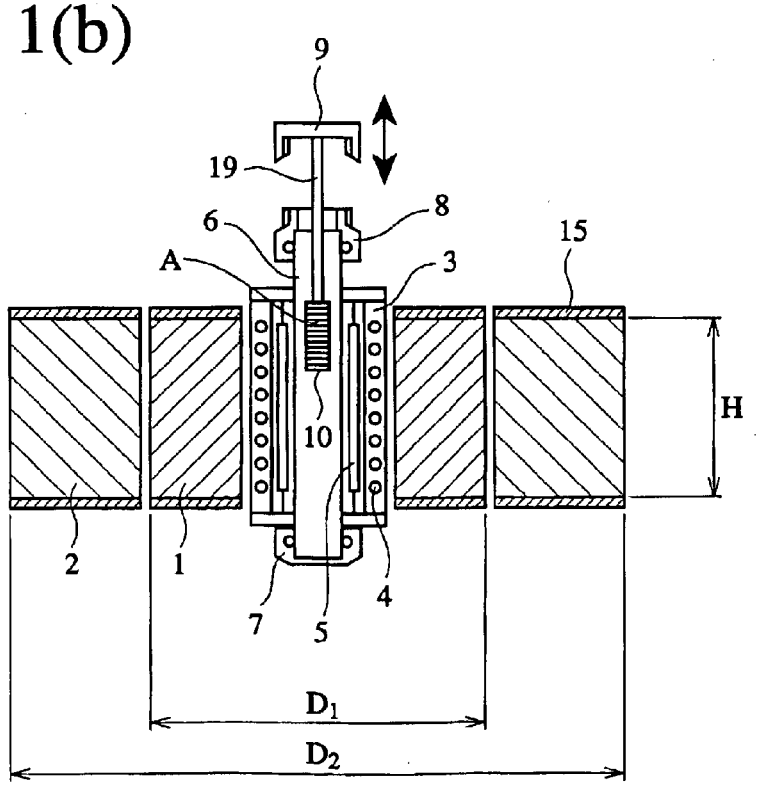
FIG. 1(b) is a vertical cross-sectional view showing one example of the second heat-treating furnace with a magnetic field of the present invention.

Also, as shown in FIG. 1(b), the second heat-treating furnace with a magnetic field of the present invention comprises a heat treatment means comprising a heat-treating container 6 and a heating means 5, and a magnetic field-generating means disposed around the heat treatment means via a cooling means 3, the magnetic field-generating means being a double ring-type, Halbach-type magnetic circuit constituted by an inner, ring-shaped, permanent magnet assembly 1 and an outer, ring-shaped, permanent magnet assembly 2, whereby a uniform magnetic field can stably be generated in one direction in a horizontal plane and in a relatively limited range in an axial direction at a low cost. The magnetic field strength in the center hole 20 can be controlled arbitrarily. Accordingly, it is suitable for heat-treating a plurality of relatively thin, large-diameter (for instance, 6–8 inches or more) wafer substrates A with thin magnetic layers at a time.

In the second heat-treating furnace with a magnetic field, the inner, ring-shaped, permanent magnet assembly 1 and the outer, ring-shaped, permanent magnet assembly 2 both constituting the magnetic field-generating means are rotatable relative to each other, though articles A to be heat-treated and the inner, ring-shaped, permanent magnet assembly 1 are desired to be unchanged in their relative directions. For instance, both of the articles A to be heat-treated and the inner, ring-shaped, permanent magnet assembly 1 may be stationary. Alternatively, the articles A to be heat-treated and the inner, ring-shaped, permanent magnet assembly 1 may be rotated simultaneously, and the outer, ring-shaped, permanent magnet assembly 2 may be rotated relative to them. With the concentric, double-ring-shaped magnetic circuits 1, 2 rotated relatively, magnetic fields generated by the inner and outer ring-shaped, permanent magnet assemblies 1, 2 are combined to provide a synthesized magnetic field having arbitrary strength in the center hole 20. Thus, a parallel magnetic field in a horizontal plane in the center hole 20 can change substantially in a range of 0–2 T along with the rotation of the outer, ring-shaped, permanent magnet assembly 2, assuming that each ring-shaped, permanent magnet assembly 1, 2 has a magnetic field strength of 1 T.

Figure 9:
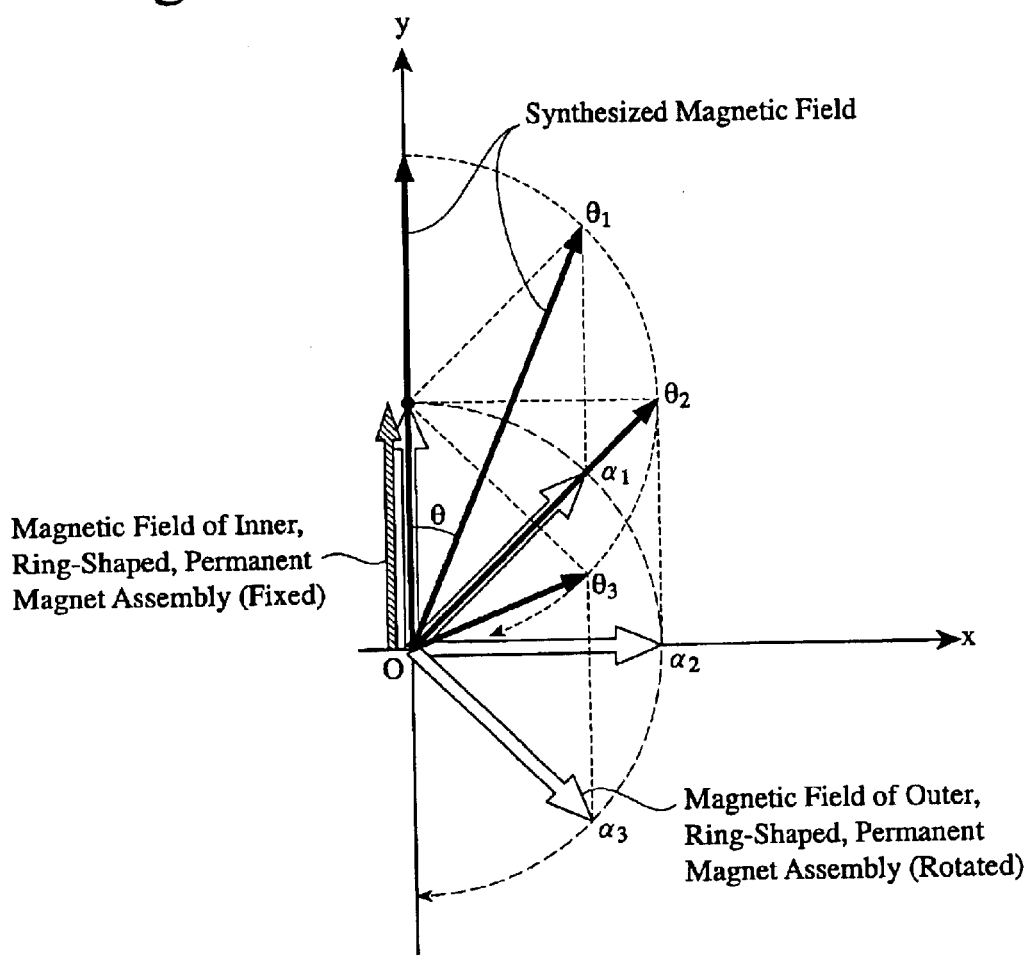
FIG. 9 is a schematic view showing the relation between the rotation angle of the outer, ring-shaped, permanent magnet assembly to the inner, ring-shaped, permanent magnet assembly and the slanting angle of a synthesized magnetic field.

To stabilize the quality of articles A heat-treated in a magnetic field, it is preferable to make the magnetic field strength substantially zero in the center hole 20 when the articles A are introduced into and taken out of the heat-treating furnace 6. The term "substantially zero" in connection with the magnetic field strength means that the magnetic field strength is so small that the magnetization of the heat-treated articles is not affected by the existing magnetic field. When the outer, ring-shaped, permanent magnet assembly 2 is rotated relative to the inner, ring-shaped, permanent magnet assembly 1, a synthesized magnetic field in the center hole 20 of the inner ring-shaped, permanent magnet assembly 1 changes in a range of about 0–2 T while rotating as shown in FIG. 9.

Accordingly, the heat treatment method of the present invention comprises the steps of (1) rotating the outer, ring-shaped, permanent magnet assembly 2 such that a magnetic field generated from the outer, ring-shaped, permanent magnet assembly 2 and a magnetic field generated from the inner, ring-shaped, permanent magnet assembly 1 are directed substantially oppositely, and introducing the articles A to be heat-treated into the heat-treating container 6 and setting them at an axial center of a synthesized magnetic field generated from the magnetic circuits of both ring-shaped, permanent magnet assemblies 1, 2, in a state where the magnetic field strength is substantially zero; (2) heat-treating the articles A with the magnetic field strength controlled to a desired strength by rotating the outer, ring-shaped, permanent magnet assembly 2; and (3) after the completion of the heat treatment, taking the heat-treated articles A out of the heat-treating container 6 with the magnetic field strength turned to substantially zero again by the same method as above. In this case, if the inner, ring-shaped, permanent magnet assembly 1 is rotated with the articles A stationary, a magnetic field applied to the articles A changes, resulting in likelihood of unevenness and deterioration in the magnetic properties of the heat-treated articles A. Accordingly, the relative directions of the articles A to be heat-treated in the center hole 20 and the inner, ring-shaped, permanent magnet assembly 1 are preferably unchanged.

Magnetic fields generated from both ring-shaped, permanent magnet assemblies 1, 2 are vector-synthesized. Accordingly, when each magnetic field generated from the inner, ring-shaped, permanent magnet assembly 1 and the outer, ring-shaped, permanent magnet assembly 2 is as strong as, for instance, 0.5 T, the relation between the rotation angle α of the outer, ring-shaped, permanent magnet assembly 2 to the inner, ring-shaped, permanent magnet assembly 1 and the slanting angle θ of the generated magnetic field is as shown in FIG. 9. Thus, when the inner, ring-shaped, permanent magnet assembly 1 is rotated to change the synthesized field strength, the magnetic field is finally turned to a just opposite direction (180°). However, when the outer, ring-shaped, permanent magnet assembly 2 is rotated, the slanting angle θ of the synthesized magnetic field is 90° at maximum. To keep applying a magnetic field to the heat-treated articles A in a constant direction while the magnetic field is returned to substantially zero after the heat treatment, the inner, ring-shaped, permanent magnet assembly 1 or the heat-treating holder 10 should be rotated in alignment with the direction of the synthesized magnetic field of both ring-shaped, permanent magnet assemblies 1, 2.

When the inner, ring-shaped, permanent magnet assembly 1 and the outer, ring-shaped, permanent magnet assembly 2 are concentrically arranged without a gap therebetween, they can be regarded as constituting one ring-shaped magnetic circuit. When there is a gap between the inner, ring-shaped, permanent magnet assembly 1 and the outer, ring-shaped, permanent magnet assembly 2, a magnetic resistance increases therebetween, resulting in decrease in the magnetic field strength in the center hole 20 of the inner, ring-shaped, permanent magnet assembly 1. Accordingly, when there is no gap between the inner, ring-shaped, permanent magnet assembly 1 and the outer, ring-shaped, permanent magnet assembly 2, the magnetic field-generating means is minimum in size. Therefore, the performance of the magnetic field-generating means can be determined by the inner diameter of the inner, ring-shaped, permanent magnet assembly 1 and the outer diameter of the outer, ring-shaped, permanent magnet assembly 2.

With wafers to be heat-treated having a diameter of 30 mm, the inner diameter of the vacuum container 6 is 50 mm when there is a gap of 10 mm between the outer periphery of each wafer and the inner wall of the vacuum container 6. Because the wall thickness of the vacuum container 6 is, for instance, 5 mm, the thickness of the heater 5 is, for instance, 5 mm, and the thickness of the cooling means 3 is, for instance, 20 mm, the inner diameter of the inner, ring-shaped, permanent magnet assembly 1 is 120 mm with the total clearance of 10 mm between parts.

Figure 8:
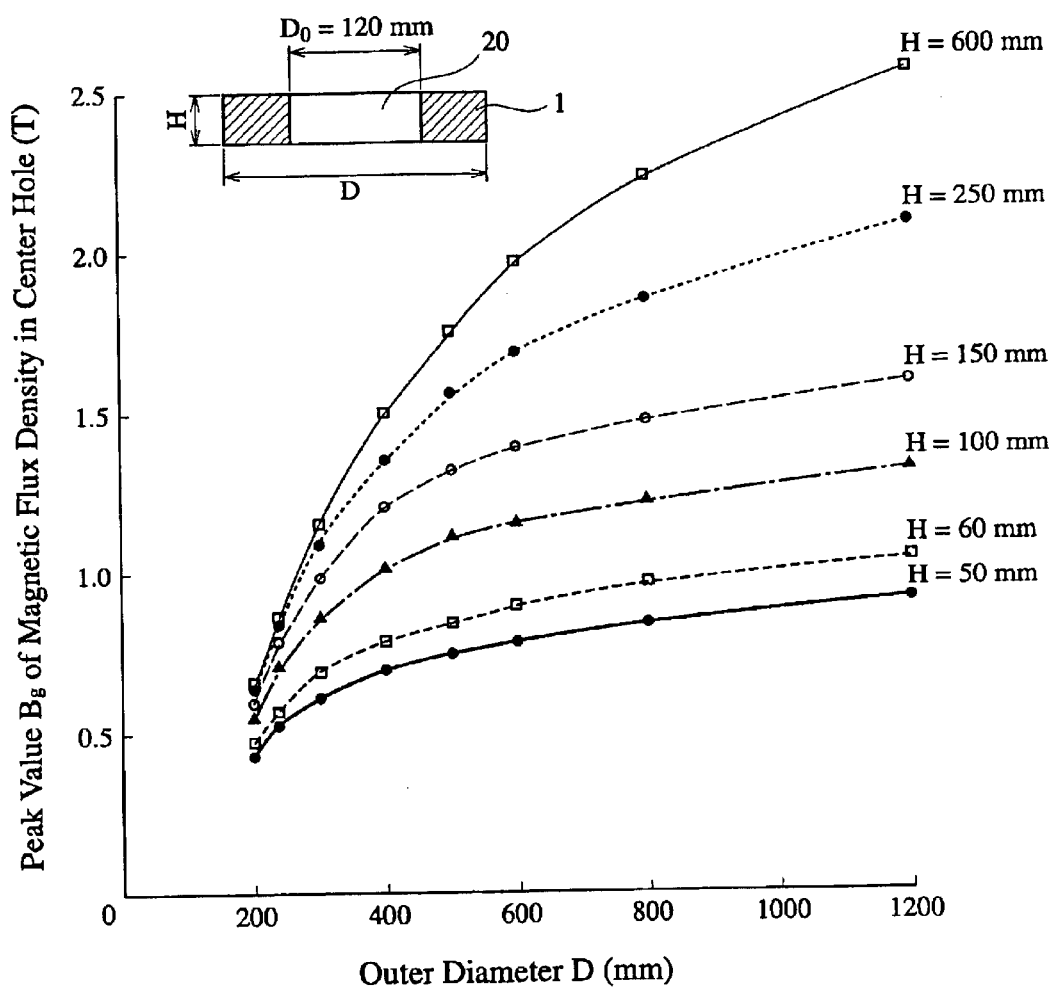
FIG. 8 is a graph showing the dependency of a magnetic flux density in the center hole on the outer diameter and axial direction length of the magnetic circuit.

When the inner, ring-shaped, permanent magnet assembly 1 has an inner diameter $D_0$ of 120 mm as shown in FIG. 8, with the permanent magnet having a residual magnetic flux density Br of 1.45 T, the outer diameter D of the ring-shaped, permanent magnet assembly is preferably 300 mm or more, and the length H of the permanent magnet assembly in an axial direction is preferably 100 mm or more, in order that a magnetic field strength in the center hole 20 exceeds 1 T.

According to "Journal of Applied Physics" Vol. 86, No. 11, Dec. 1, 1999, the magnetic field strength B in the center hole of the inner, ring-shaped, permanent magnet assembly is calculated by $B=Br/(Ro/Ri)$, wherein Ri is a radius of the center hole, and Ro is an outer radius of the outer, ring-shaped, permanent magnet assembly. However, it has been found as a result of the calculation of the magnetic field strength by simulation that the magnetic field strength changes along the axial length of the ring-shaped, permanent magnet assembly 1 as shown in FIG. 8, and that the shorter the ring-shaped, permanent magnet assembly 1, the smaller the magnetic field strength in the center hole 20. This result reveals that to achieve a magnetic flux density of 1 T or more in the center hole 20, both of the outer, ring-shaped, permanent magnet assembly 2 and the inner, ring-shaped, permanent magnet assembly 1 should have an axial length of 100 mm or more.

To reduce a leaked magnetic flux, the outer, ring-shaped, permanent magnet assembly 2 is desirably shorter in an axial direction than the inner, ring-shaped, permanent magnet assembly 1. With the inner, ring-shaped, permanent magnet assembly 1 and/or the outer, ring-shaped, permanent magnet assembly 2 becoming shorter toward outside in a radial direction, the leaked magnetic field is further reduced in an axial direction. With such a structure, the leaked magnetic flux of the ring-shaped magnetic circuit can be made small, enabling the reduction in size and weight of the magnetic circuit.

Figure 3:
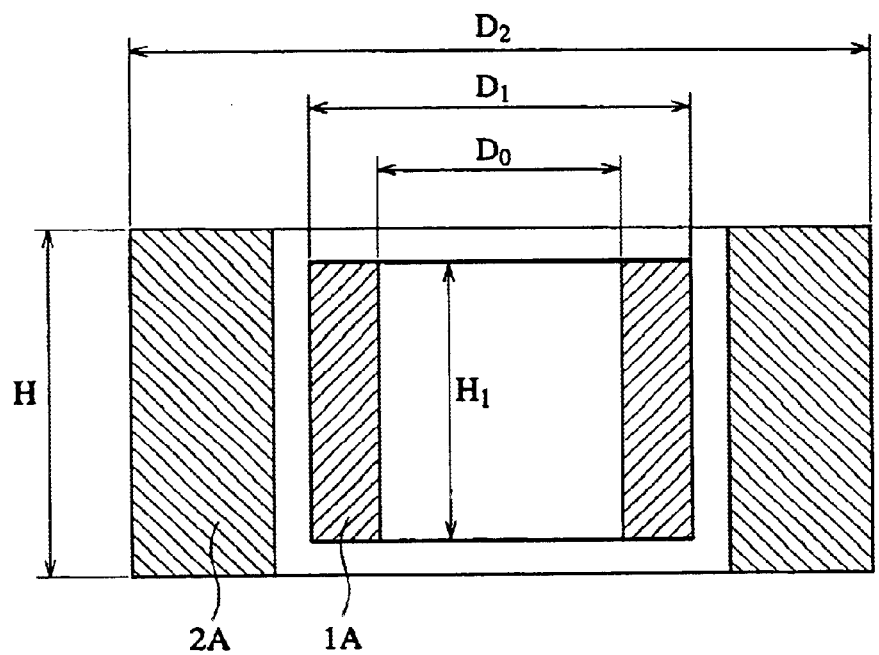
FIG. 3 is a cross-sectional view showing another example of a combination of the inner, ring-shaped, permanent magnet assembly and the outer, ring-shaped, permanent magnet assembly.

As shown in FIG. 3, to make the magnetic circuit small, the axial length $H_1$ of the inner, ring-shaped, permanent magnet assembly 1 may be made smaller than the axial length H of the outer, ring-shaped, permanent magnet assembly 2. To achieve a uniform magnetic field region of the same length, it is more efficient to lengthen the ring-shaped, permanent magnet assembly rather than to enlarge its radius, resulting in decrease in an installation area.

The permanent magnets used for the inner, ring-shaped, permanent magnet assembly 1 and the outer, ring-shaped, permanent magnet assembly 2 preferably have a residual magnetic flux density of 1.1 T or more and coercivity of 1114 kA/m (14 kOe) or more, and the axial length $H_1$ of the inner, ring-shaped, permanent magnet assembly 1 and the outer diameter $D_2$ of the outer, ring-shaped, permanent magnet assembly 2 preferably meet the requirement of $2 \leq D_2/H_1 \leq 10$. The larger the ratio $D_2/H_1$, the wider the axial range in which a uniform magnetic field can be generated. In this range, a large magnetic field can be generated with the reduced weight of the overall ring-shaped, permanent magnet assemblies 1, 2.

In the heat-treating furnace with a magnetic field of the present invention, as shown in FIG. 1, the heat treatment means comprises a cooling means 3 having a case with a mirror surface and a cooling pipe 4 contained in the case, a heating means 5 such as a carbon heater embedded in a quartz glass, and a vacuum container 6 made of a transparent quartz glass, into which a heat-treating holder 10 holding a plurality of articles A to be heat-treated is introduced. With this heat treatment means, a magnetic field center of the magnetic field-generating means consisting of the inner, ring-shaped, permanent magnet assembly 1 and the outer, ring-shaped, permanent magnet assembly 2 is easily aligned with a center of an assembly of articles A to be heat-treated. Because there is a cooling means 3 between the heating means 5 and the magnetic field-generating means, the permanent magnets are protected from thermal influence. Accordingly, despite the heat treatment temperature at about 250–300° C., the permanent magnets are not thermally deteriorated. Incidentally, the heat treatment means may be placed in a non-oxidizing atmosphere such as a nitrogen gas.

The permanent magnets used for the inner, ring-shaped, permanent magnet assembly 1 and the outer, ring-shaped, permanent magnet assembly 2 may be ferrite magnets such as Ba-ferrite magnets, Sr-ferrite magnets, ferrite magnets containing La and Co, and rare earth magnets such as Nd—Fe—B magnets, Sm—Co magnets, Sm—Fe—N magnets, etc. Nd—Fe—B magnets having a high residual magnetic flux density are particularly preferable. The permanent magnets are not limited to sintered magnets but may be bonded magnets. Though it has been difficult to use Nd—Fe—B magnets for conventional heat-treating furnaces because of low heat-resistant temperature, it has become possible to use them for the heat-treating furnace with a magnetic field of the present invention by providing the cooling means 3 between the heat treatment means and the magnetic field-generating means.

When a magnetic field is continuously applied during the heat treatment, an outer, ring-shaped, permanent magnet assembly 2 may not be installed outside the inner, ring-shaped, permanent magnet assembly 1, because there is no need of controlling a magnetic field.

Example 1

Figure 2A:
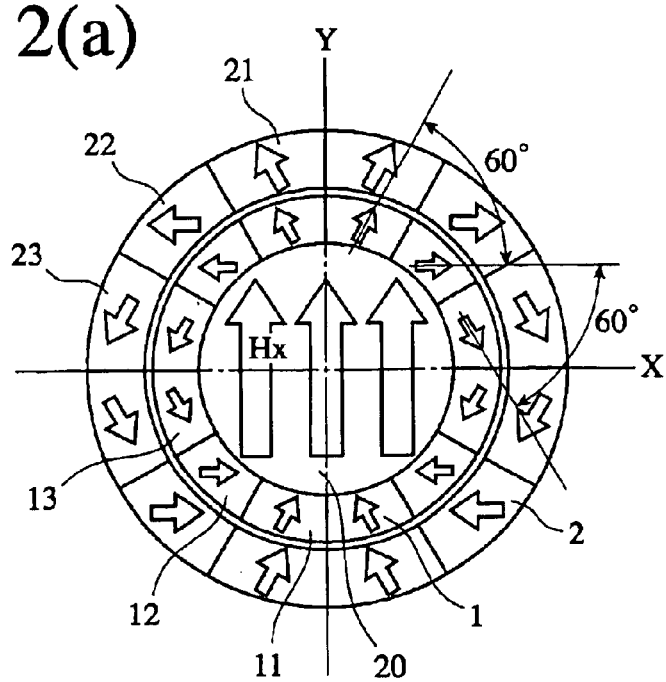
FIG. 2(a) is a schematic cross-sectional view showing a magnetic field-generating means of the heat-treating furnace with a magnetic field of the present invention, in which the magnetization direction of the permanent magnet segments of an inner, ring-shaped, permanent magnet assembly is identical with the magnetization direction of the permanent magnet segments of an outer, ring-shaped, permanent magnet assembly.

The magnetic field-generating means in the heat-treating furnace with a magnetic field of the present invention shown in FIG. 1 comprises an inner, ring-shaped, permanent magnet assembly 1 and an outer, ring-shaped, permanent magnet assembly 2. Every permanent magnet segment constituting each magnetic circuit 1, 2 was formed by a Nd—Fe—B permanent magnet having a residual magnetic flux density of 1.4 T and coercivity of 1192 kA/m. FIG. 2 shows the lateral cross section structure of the inner, ring-shaped, permanent magnet assembly 1 and the outer, ring-shaped, permanent magnet assembly 2.

In this Example, the inner, ring-shaped, permanent magnet assembly 1 is formed by arranging three types of fan-shaped permanent magnet segments 11, 12, 13 having different magnetization directions in the total number of 12 in a peripheral direction. Because the fan-shaped permanent magnet segments 11, 12, 13 have the same shape, a center angle of their fan shape is 30°. The outer, ring-shaped, permanent magnet assembly 2 is also formed by arranging three types of fan-shaped permanent magnet segments 21, 22, 23 having different magnetization directions in the total number of 12 in a peripheral direction. Because the fan-shaped permanent magnet segments 21, 22, 23 also have the same shape, a center angle of their fan shape is 30°. Incidentally, the horizontal cross section shape of each permanent magnet segment 11, 12, 13, 21, 22, 23 may be trapezoid instead of fan.

In each ring-shaped, permanent magnet assembly 1, 2, a plurality of permanent magnet segments is arranged in a ring shape, such that their magnetization directions are substantially in alignment with the flow of a magnetic flux, and that the magnetic flux flows through the center hole in a diameter direction. Accordingly, a synthesized magnetic field shown by the arrow of the inner, ring-shaped, permanent magnet assembly 1 and the outer, ring-shaped, permanent magnet assembly 2 is in a radial direction in the center hole 20.

In this Example, the inner, ring-shaped, permanent magnet assembly 1 had an inner diameter $D_0$ of 360 mm and an outer diameter $D_1$ of 560 mm. Also, the outer, ring-shaped, permanent magnet assembly 2 had an outer diameter $D_2$ of 1200 mm. Both ring-shaped, permanent magnet assemblies 1, 2 had an axial length (height) H of 420 mm. There is a small gap between the inner, ring-shaped, permanent magnet assembly 1 and the outer, ring-shaped, permanent magnet assembly 2, such that they are rotatable to each other. The inner, ring-shaped, permanent magnet assembly 1 is stationary. A holding member 15 of the outer, ring-shaped, permanent magnet assembly 2 is provided with a gear (not shown) at a lower end as a driving means (not shown) thereof. The gear engages a servomotor, etc. Accordingly, the outer, ring-shaped, permanent magnet assembly 2 is rotatable to the inner, ring-shaped, permanent magnet assembly 1.

The heat treatment means in this embodiment comprises a water-cooling means 3 comprising a stainless steel plate with a mirror-plated surface, an electric heater 5 for heating articles A to be heat-treated in a vacuum container 6, and a vacuum container 6 disposed inside the electric heater 5 and formed by a quartz glass having an inner diameter of about 220 mm. The water-cooling means 3 comprises a water-cooling pipe 4. The water-cooling means 3 may comprise a heat sink plate in addition to the water-cooling pipe 4, the heat sink plate being disposed between the water-cooling pipe 4 and the inner, ring-shaped, permanent magnet assembly 1. Because heating is mostly by radiation heat in vacuum, the quartz glass constituting the vacuum container 6 is preferably transparent. Because the articles A to be heat-treated are expected to be wafer substrates of 6–8 inches, the vacuum container 6 preferably has an inner diameter of about 170–220 mm.

The vacuum container 6 has one end sealed by a seal member 7 and the other end sealed by a sealing male screw 8 and a sealing female screw 9. The sealing female screw 9 has a shaft 19 provided with a heat-treating holder 10 for holding the articles A in the vacuum container 6 substantially at a center.

The heat-treating holder 10 has a structure comprising about 25 trays for supporting, for instance, wafer substrates having thin magnetic layers at an interval of about 6 mm in an axial direction. The heat-treating holder 10 is rotatable in a horizontal plane in the vacuum container 6. When the outer, ring-shaped, permanent magnet assembly 2 is rotated to adjust the magnetic field, a synthesized magnetic field of the inner, ring-shaped, permanent magnet assembly 1 and the outer, ring-shaped, permanent magnet assembly 2 also inevitably rotates. Accordingly, to prevent the synthesized magnetic field from rotating relative to the articles A to be heat-treated, the heat-treating holder 10 is preferably rotated such that the articles A is always kept in the same direction as that of the synthesized magnetic field.

The temperature was measured by thermocouples equipped at the upper, middle and lower ends of the heat-treating holder 10 to carry out the PID control of the temperature of the electric heater 5. The seal portion 7 has a gas inlet. An evacuation outlet connected to a vacuum pump (not shown) is provided in an upper portion of the vacuum container 6, to keep the inside of the vacuum container 6 in a vacuum state. When the articles A to be heat-treated are, for instance, substrates having thin magnetic layers, the heat-treating is carried out preferably under a vacuum condition of about $1 \times 10^{-5} - 1 \times 10^{-6}$ Pa. The gas inlet is connected to a nitrogen gas tank to provide an inert atmosphere in the vacuum container 6, if necessary.

Figure 2B:
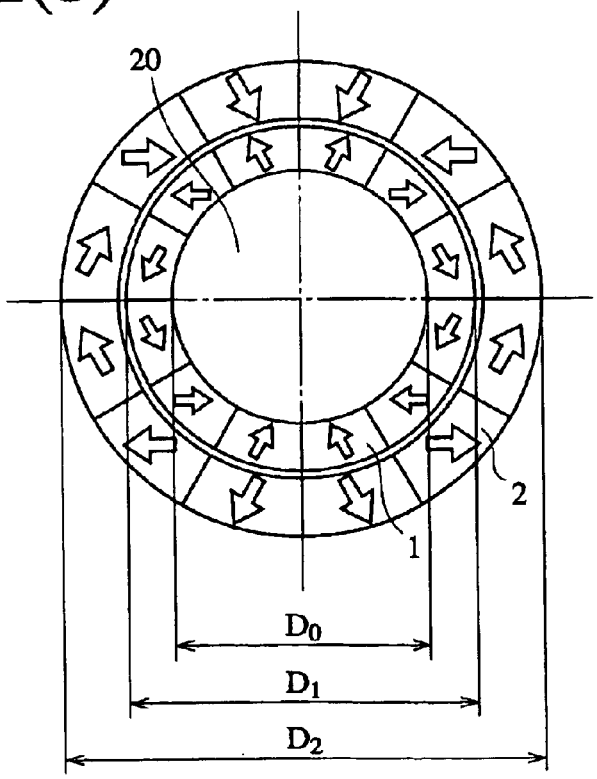
FIG. 2(b) is a schematic cross-sectional view showing a magnetic field-generating means of the heat-treating furnace with a magnetic field of the present invention, in which the magnetization direction of the permanent magnet segments of an inner, ring-shaped, permanent magnet assembly is substantially opposite to the magnetization direction of the permanent magnet segments of an outer, ring-shaped, permanent magnet assembly.

As shown in FIG. 2(b), the outer, ring-shaped, permanent magnet assembly 2 is rotated to a position at which a magnetic field in the center hole 20 is substantially zero. A plurality of wafer substrates having thin magnetic layers constituted by laminating a plurality of ferromagnetic layers via non-magnetic insulating layers are disposed on the trays of the heat-treating holder 10, and inserted into the vacuum container 6. At this time, all stacked substrates were positioned such that their center was substantially identical with the center of the inner, ring-shaped, permanent magnet assembly 1 and the outer, ring-shaped, permanent magnet assembly 2.

Figure 2C:
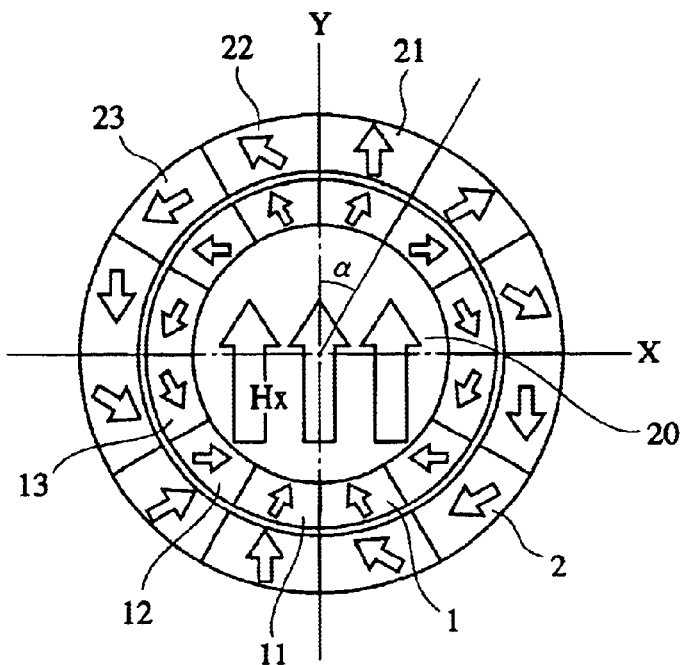
FIG. 2(c) is a schematic cross-sectional view showing a magnetic field-generating means of the heat-treating furnace with a magnetic field of the present invention, in which the outer, ring-shaped, permanent magnet assembly is rotated relative to the inner, ring-shaped, permanent magnet assembly by an angle α.

After the sealing female screw 9 was screwed to the sealing male screw 8 to make the vacuum container 6 gas-tight, the vacuum container 6 was evacuated to a vacuum degree of $1 \times 10^{-5} - 1 \times 10^{-6}$ Pa by a vacuum pump. With the relative position of the wafer substrates and the inner, ring-shaped, permanent magnet assembly 1 fixed, only the outer, ring-shaped, permanent magnet assembly 2 was rotated. As shown in FIG. 2(c), the outer, ring-shaped, permanent magnet assembly 2 was rotated to an angle α to the inner, ring-shaped, permanent magnet assembly 1, thereby generating a synthesized magnetic field of the desired strength in the center hole 20.

While flowing cooling water through the cooling pipe 4, the wafer substrates were heated at a speed of 5° C./min by the electric heater 5. After the temperature was kept at 300° C. ±3% for 30–60 minutes, the temperature was lowered at a speed of 2° C./min in the vacuum container 6. When the temperature of the wafers reached 150° C. or lower, the angle α of the outer, ring-shaped, permanent magnet assembly 2 to the inner, ring-shaped, permanent magnet assembly 1 was controlled again as shown in FIG. 2(b), to make the magnetic field substantially zero.

Figure 7:
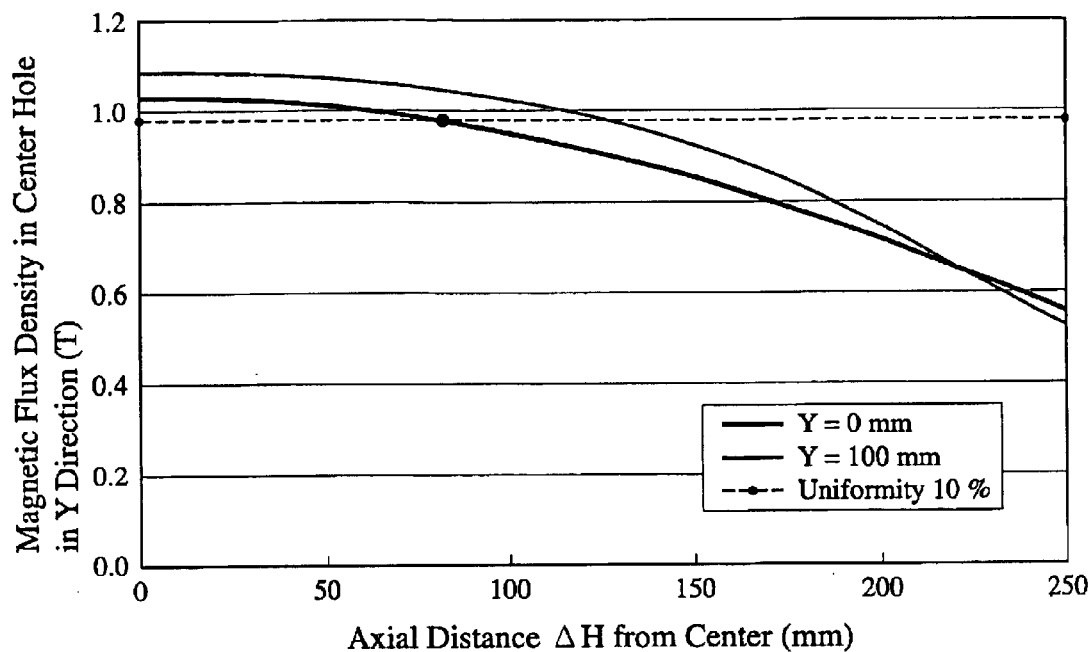
FIG. 7 is a graph showing a magnetic field strength distribution in the center hole of a ring-shaped, permanent magnet assembly along an axial direction thereof.
Figure 7:
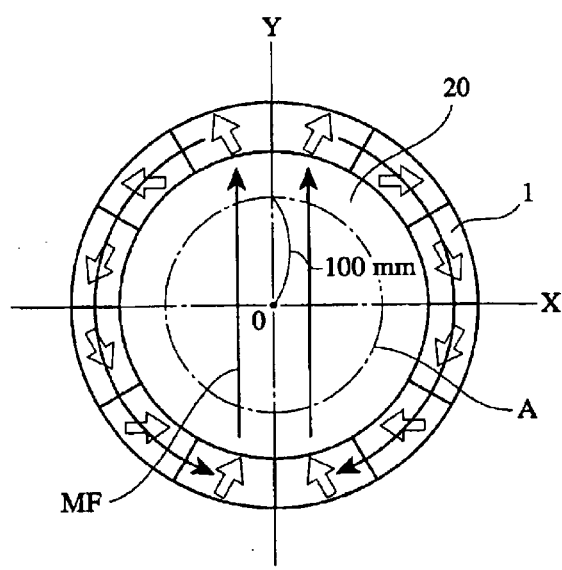

It was confirmed from Table 1 that the magnetic field was as uniform as within ±5% at an axial center in the center hole 20. As shown in FIG. 7, as uniform magnetic field strength as 10% or less was obtained in a range from the center of both ring-shaped magnetic circuits to ±80 mm in an axial length of 420 mm, in which wafer substrates were disposed. The magnetic field skew angle was within 2° at every measurement position. Magnetic heads formed from the wafer substrates heat-treated in such a magnetic field had good magnetic properties with a deficiency ratio of 0.

A leaked magnetic field at a position 350 mm away from the end surface of the magnetic circuit in an axial direction was as small as 10 m T or less, and a leaked magnetic field at a position 1 m away from the side surface of the magnetic circuit was also as small as 1 m T or less.

TABLE 1

| Axial Distance ΔH (mm) from Center | Magnetic Flux Density in Center Hole | | | |
|---|---|---|---|---|
| | Maximum $T_{max}$ (T) | Minimum $T_{min}$ (T) | Uniformity[1] (%) | Maximum Skew Angle (deg) |
| 0 | 1.096 | 1.034 | 5.7 | 1.0 |
| 75 | 1.056 | 0.988 | 6.4 | 1.3 |
| Range of 0–75 | 1.096 | 0.988 | 9.9 | 1.3 |

Note: (1) The uniformity of a magnetic flux density was calculated by $(T_{max}-T_{min})/T_{max}$.

Example 2

Heat treatment was carried out in a magnetic field in the same manner as in Example 1 except for changing the axial lengths of an outer, ring-shaped, permanent magnet assembly 2 and an inner, ring-shaped, permanent magnet assembly 1A as shown in FIG. 3, and preventing the wafer substrates from rotating with the inner, ring-shaped, permanent magnet assembly 1A. Each ring-shaped, permanent magnet assembly was constituted by three types of fan-shaped permanent magnet segments having different magnetization directions, which were arranged in the number of 12 in a peripheral direction. Each permanent magnet segment has the same magnetization direction as shown in FIG. 2.

As a heat-treating furnace with a magnetic field for 8-inch wafer substrates, the inner, ring-shaped, permanent magnet assembly 1A had an inner diameter $D_0$ of 360 mm and an outer diameter $D_1$ of 560 mm. The outer, ring-shaped, permanent magnet assembly 2A had an outer diameter $D_2$ of 1100 mm. The inner, ring-shaped, permanent magnet assembly 1A had an axial length $H_1$ of 420 mm, and the outer, ring-shaped, permanent magnet assembly 2A had an axial length H of 500 mm.

As shown in Table 2, as uniform magnetic field strength as ±5% or less was obtained in the center hole 20. The measurement of the variations of magnetic field strength revealed that as uniform magnetic field strength as within±5% was obtained in a range of ±80 mm from the axial center of the inner, ring-shaped, permanent magnet assembly 1A having a length of 420 mm. It is preferable to place the wafer substrates in this range. When the wafer substrates are held outside this range, magnetic heads obtained from the wafer substrates have deteriorated characteristics because of low uniformity in a magnetic field. A skew angle of the magnetic field was within 2° at each measurement position. Magnetic heads formed from the wafer substrates heat-treated in a magnetic field in this Example had good magnetic properties, with a deficiency ratio of 0. When the magnetic field was reduced to substantially zero without rotating the inner, ring-shaped, permanent magnet assembly 1A and the wafer substrates in a state where the temperature of the wafers was 50° C. or less after the heat treatment, the resultant magnetic heads had good performance.

Though the outer, ring-shaped, permanent magnet assembly is about 19% longer in an axial direction and about 10% shorter in a radial direction in Example 2 than in Example 1, the outer, ring-shaped, permanent magnet assembly is slightly lighter in weight in Example 2 than in Example 1. Accordingly, the magnetic field-generating means has a smaller installation area with a longer uniform magnetic field region in Example 2 than in Example 1.

TABLE 2

| Axial Distance | Magnetic Flux Density in Center Hole | | | |
|---|---|---|---|---|
| ΔH (mm) from Center | Maximum $T_{max}$ (T) | Minimum $T_{min}$ (T) | Uniformity[1] (%) | Maximum Skew Angle (deg) |
| 0 | 1.086 | 1.031 | 5.0% | 1.0 |
| 80 | 1.046 | 0.979 | 6.4% | 1.3 |
| Range of 0–80 | 1.086 | 0.979 | 9.8% | 1.3 |

Note: (1) The uniformity of a magnetic flux density was calculated by $(T_{max}-T_{min})/T_{max}$.

Comparative Example 1

Heat treatment experiment was carried out in a magnetic field in the same manner as in Example 1 except for disposing a heater 5 outside both ring-shaped, permanent magnet assemblies 1, 2 in an axial direction. There was unevenness in a temperature distribution at each position of a heat-treating holder 10, resulting in unevenness in the magnetic properties of each magnetic head.

Comparative Example 2

Heat treatment experiment was carried out in a magnetic field in the same manner as in Example 1 except for removing the cooling means 3. Though there was no unevenness in a temperature distribution at each position of the heat-treating holder 10, the permanent magnets of the inner, ring-shaped, permanent magnet assembly 1 were demagnetized by heat during the heat treatment, failing to obtain sufficient magnetic field strength.

Example 3

A heat-treating furnace with a magnetic field comprising an inner, ring-shaped, permanent magnet assembly 1 and an outer, ring-shaped, permanent magnet assembly 2 each constituted by 12 permanent magnet segments having magnetization directions shown in FIG. 2 was used as in Example 1. The inner, ring-shaped, permanent magnet assembly 1 had an inner diameter $D_0$ of 360 mm and an outer diameter $D_1$ of 560 mm. The outer, ring-shaped, permanent magnet assembly 2 had an outer diameter $D_2$ of 1100 mm. Both ring-shaped, permanent magnet assemblies 1, 2 had an axial length (height) H of 420 mm.

The inner, ring-shaped, permanent magnet assembly 1 has a case 11 provided with a gear on a lower surface, so that it is rotatable relative to the outer, ring-shaped, permanent magnet assembly 2 and the wafer substrates by a motor. Accordingly, the relative position of the wafer substrates to the inner, ring-shaped, permanent magnet assembly 1 changed. This Example is the same as Example 1 in other points.

The magnetic field in the center hole 20 was the same as shown in Table 2, having uniform strength of ±5% or less at an axial center. The measurement of the magnetic field strength variation along the axial length H revealed that there was uniform magnetic field strength of ±5% or less in a range of ±80 mm from the center of the axial length H. The skew angle of the magnetic field was within 2° at each measurement position. Magnetic heads formed from wafer substrates heat-treated in a magnetic field in this Example had good magnetic properties, though they were lower than those of Examples 1 and 2.

Example 4

Figure 4:
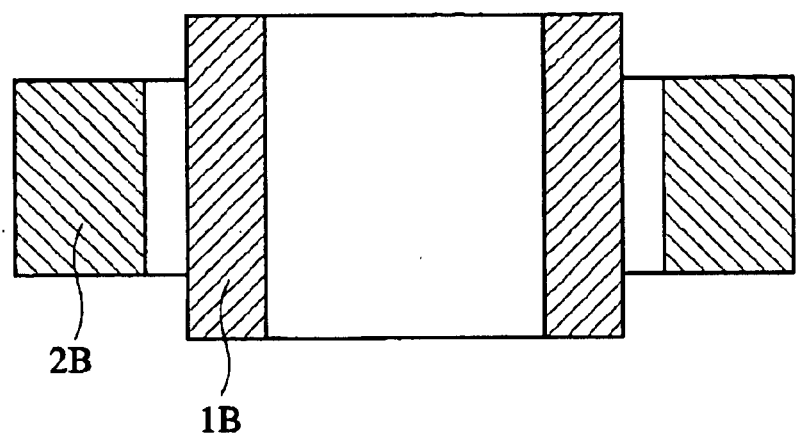
FIG. 4 is a cross-sectional view showing a further example of a combination of the inner, ring-shaped, permanent magnet assembly and the outer, ring-shaped, permanent magnet assembly.
Figure 5:
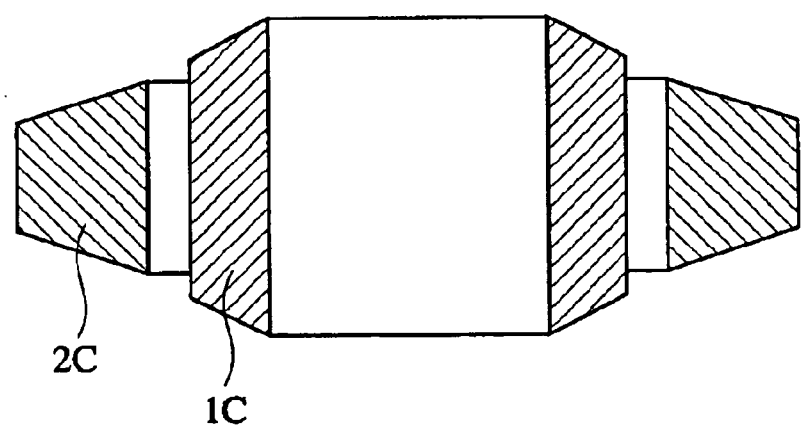
FIG. 5 is a cross-sectional view showing a still further example of a combination of the inner, ring-shaped, permanent magnet assembly and the outer, ring-shaped, permanent magnet assembly.

FIG. 4 shows another example of a combination of an inner, ring-shaped, permanent magnet assembly 1B and an outer, ring-shaped, permanent magnet assembly 2B. The outer, ring-shaped, permanent magnet assembly 2B is shorter in an axial length (height) than the inner, ring-shaped, permanent magnet assembly 1B. In the embodiment of FIG. 5, the outer, ring-shaped, permanent magnet assembly 2C is shorter in an axial length (height) than the inner, ring-shaped, permanent magnet assembly 1C, and the inner and outer ring-shaped, permanent magnet assemblies 1C, 2C have an axial length, which becomes gradually shorter as it goes toward outside in a radial direction. With this structure, the leaked magnetic field in an axial direction can be reduced. This can make the ring-shaped, permanent magnet assemblies smaller and lighter in weight, resulting in a shorter heat-treating furnace with a magnetic field.

Figure 6A:
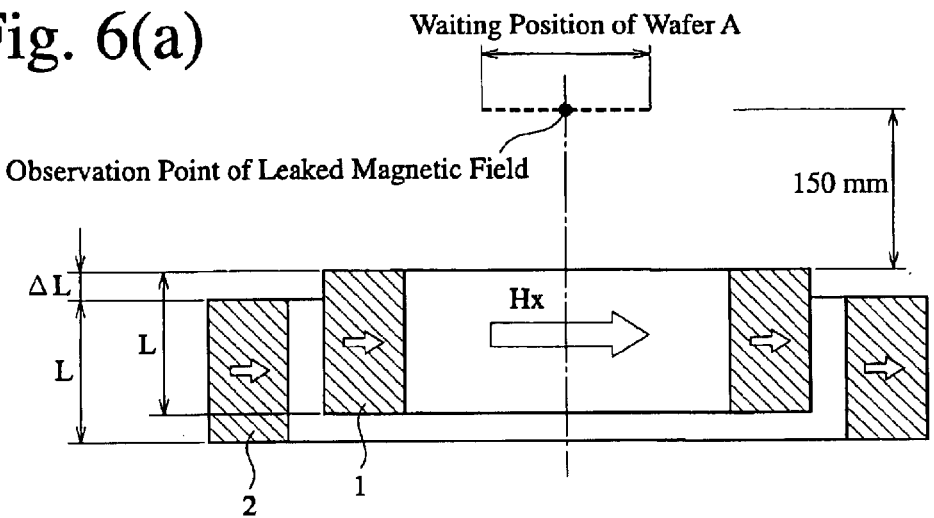
FIG. 6(a) is a cross-sectional view showing one example of the relation of the inner, ring-shaped, permanent magnet assembly and the outer, ring-shaped, permanent magnet assembly in an axial direction.

FIG. 6(a) shows an installation example, in which an outer, ring-shaped, permanent magnet assembly 2 is more distant by ΔL in an axial direction from a waiting position of wafers A as articles to be heat-treated than an inner, ring-shaped, permanent magnet assembly 1. The inner, ring-shaped, permanent magnet assembly 1 and the outer, ring-shaped, permanent magnet assembly 2 have the same axial length L.

Figure 6B:
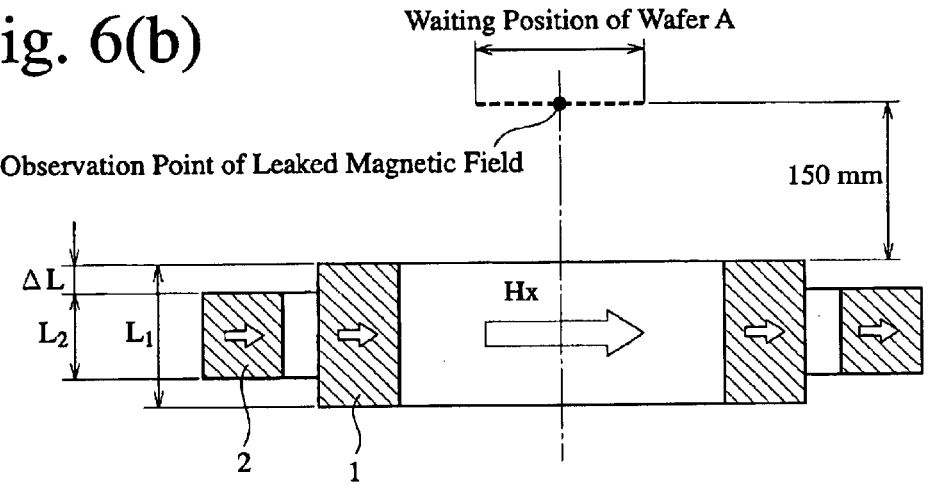
FIG. 6(b) is a cross-sectional view showing another example of the relation of the inner, ring-shaped, permanent magnet assembly and the outer, ring-shaped, permanent magnet assembly in an axial direction.

FIG. 6(b) shows an example like FIG. 6(a), in which an outer, ring-shaped, permanent magnet assembly 2 is distant by ΔL from a waiting position of wafers A, and the axial length $L_2$ of the outer, ring-shaped, permanent magnet assembly 2 is smaller than the axial length $L_1$ of an inner, ring-shaped, permanent magnet assembly 1. With the inner, ring-shaped, permanent magnet assembly having an axial length $L_1$ of 1000 mm, and with the outer, ring-shaped, permanent magnet assembly having an axial length $L_2$ of 600 mm, 800 mm and 1000 mm, respectively, a magnetic flux density in the center hole 20, and a leaked magnetic flux density at a position 150 mm distant from the end surface of the ring-shaped, permanent magnet assembly in an axial direction were calculated by simulation. The results are shown in Table 3. The center hole 20 had an inner diameter of 300 mm, the inner, ring-shaped, permanent magnet assembly 1 had an outer diameter $D_1$ of 450 mm, and the outer, ring-shaped, permanent magnet assembly had an outer diameter $D_2$ of 670 mm.

TABLE 3

|  | Length $L_2$ (mm) of Outer, Ring-Shaped, Permanent Magnet Assembly | | |
| --- | --- | --- | --- |
| Magnetic Field Strength | 600 | 800 | 1000 |
| Magnetic Field (T) at Center in Center Hole | 0.913 | 0.943 | 0.956 |
| Leaked Magnetic Field (T) at 150 mm Outside | 0.067 | 0.089 | 0.138 |
| Leaked Magnetic Field (T) With Lower Ends of Both Ring-Shaped, Permanent Magnet Assemblies Aligned | 0.021 | 0.028 | 0.035 |

Figure 6C:
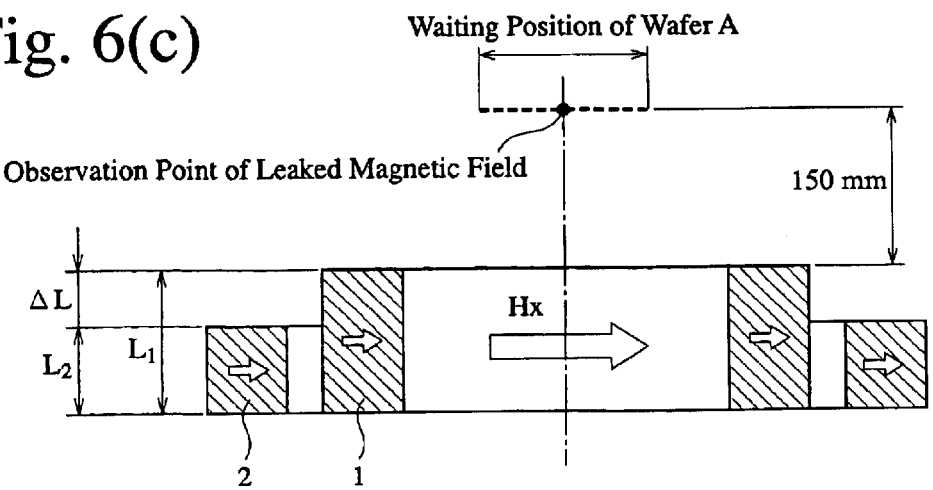
FIG. 6(c) is a cross-sectional view showing a further example of the relation of the inner, ring-shaped, permanent magnet assembly and the outer, ring-shaped, permanent magnet assembly in an axial direction.

It is clear from Table 3 that though the leaked magnetic field was about 0.14 T when both ring-shaped, permanent magnet assemblies 1, 2 had the same axial length, the leaked magnetic field was 0.1 T or less, namely reduced to 35% or less when the outer, ring-shaped, permanent magnet assembly 2 had a length of 800 mm or less. Also, when the outer, ring-shaped, permanent magnet assembly 2 had a length of 600 mm, the leaked magnetic field was further reduced. A magnetic flux density at a center of the center hole 20 was smaller by only less than 3% when the length of the outer, ring-shaped, permanent magnet assembly 2 was 800 mm than when it was 1000 mm. This reveals that the length of the outer, ring-shaped, permanent magnet assembly largely influences the level of a leaked magnetic field. When it is desired to reduce a leaked magnetic field in an axial direction, as shown in FIG. 6(c), it is preferable that the inner and outer ring-shaped, permanent magnet assemblies 1, 2 are aligned on their lower ends, and that an upper end of the outer, ring-shaped, permanent magnet assembly 1 is lower than that of the in an axial direction end surface 1 by a distance $\Delta L$.

Figure 10:
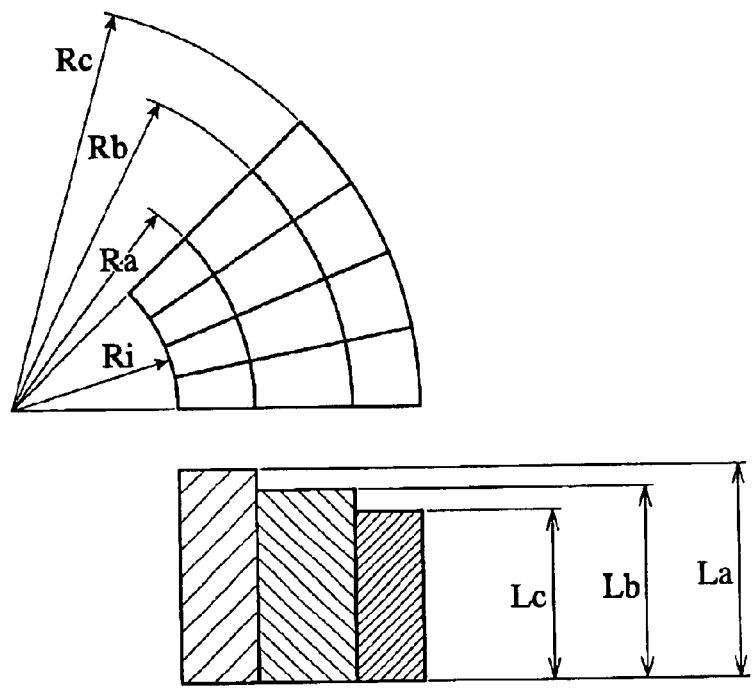
FIG. 10 is a plan view and a cross-sectional view showing one example of a permanent magnet segment consisting of a plurality of permanent magnet pieces.

As the inner diameter of the inner, ring-shaped, permanent magnet assembly 1 increases, it becomes difficult to form each permanent magnet segment of the magnetic circuit by one permanent magnet piece. Therefore, each permanent magnet segment is preferably constituted by combining a plurality of permanent magnet pieces. One example of permanent magnet segments for the ring-shaped magnetic circuit is shown in FIG. 10. Though a permanent magnet segment is constituted by three permanent magnet pieces arranged in a radial direction in this example, 2 or more permanent magnet pieces are generally used. Each permanent magnet piece on the inner side has an outer radius Ra and an axial length La, each permanent magnet piece in the middle has an inner radius Ra, an outer radius Rb and an axial length Lb, and each permanent magnet piece on the outer side has an inner radius Rb, an outer radius Rc and an axial length Lc. The axial lengths of the permanent magnet pieces meet the condition of La>Lb>Lc, becoming shorter stepwise toward outside.

Figure 11:
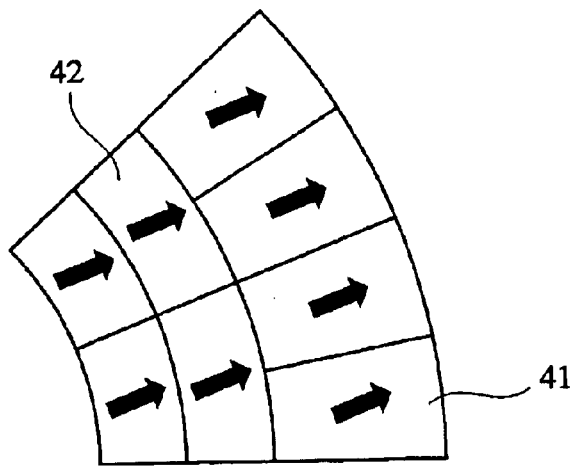
FIG. 11 is a plan view showing another example of a permanent magnet segment consisting of a plurality of permanent magnet pieces.

FIG. 11 shows an example of a permanent magnet segment constituted by the first permanent magnet pieces 41 and the second permanent magnet pieces 42 are combined. In the illustrated example, the first and second permanent magnet pieces 41, 42 respectively are constituted by combinations of two pieces, though the combination may comprise pieces in an odd number. The arrow in the figure indicates the magnetization direction of each permanent magnet segment.

Figure 12A:
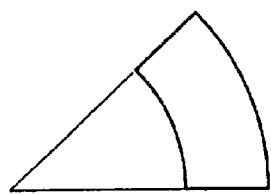
FIG. 12(a) is a plan view and a cross-sectional view showing one example of the cross section shape of a permanent magnet segment.
Figure 12A:
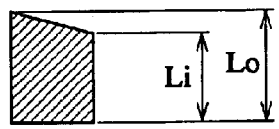
Figure 12B:
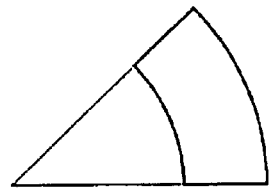
FIG. 12(b) is a plan view and a cross-sectional view showing another example of the cross section shape of a permanent magnet segment.
Figure 12B:
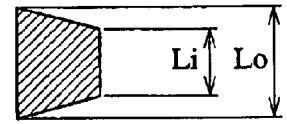

In the case of a small permanent magnet segment, it may be constituted by one permanent magnet piece. To reduce a leaked magnetic field, as shown in FIGS. 12(a) and (b), the permanent magnet preferably has, for instance, a substantially trapezoidal cross section in an axial direction.

Figure 13:
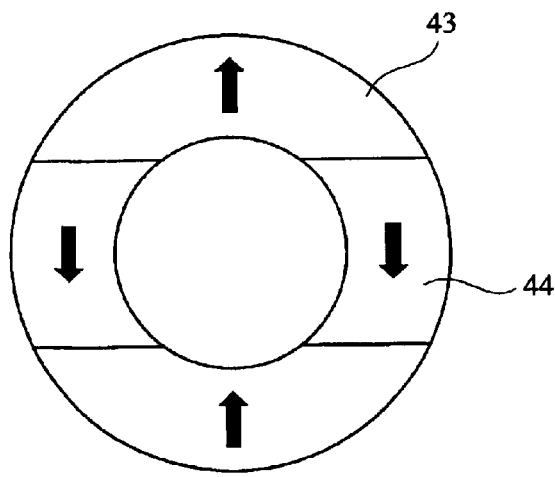
FIG. 13 is a plan view showing one example of a ring-shaped, permanent magnet assembly consisting of two types of permanent magnets with different magnetization directions.

Though a combination of three types of permanent magnets having different magnetization directions is used to constitute the inner, ring-shaped, permanent magnet assembly 1 and the outer, ring-shaped, permanent magnet assembly 2 in each of the above Examples, two types of permanent magnets 43, 44 having different magnetization directions may be used to constitute the magnetic circuit as shown in FIG. 13.

Figure 14:
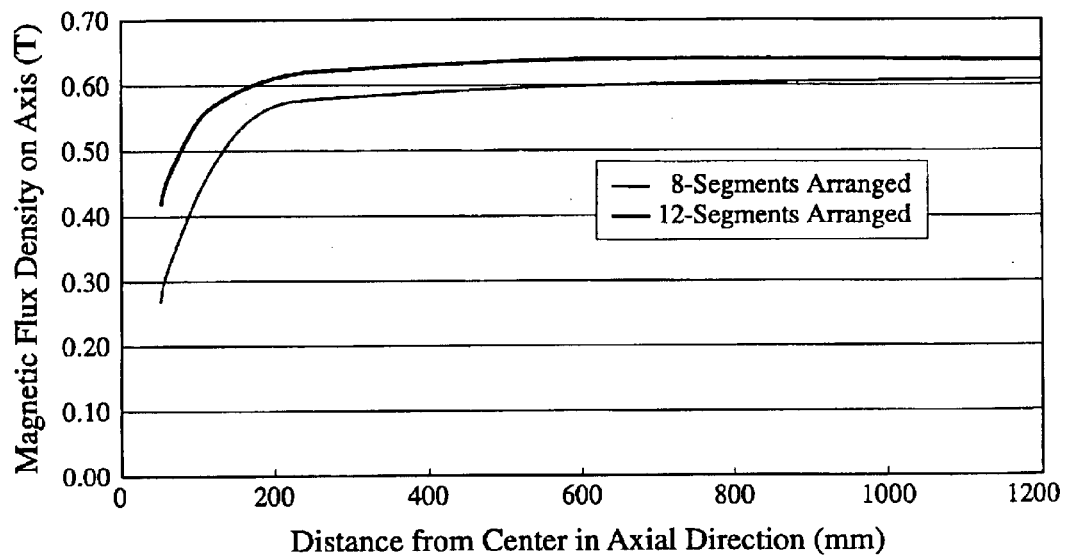
FIG. 14 is a graph showing the relation between a magnetic flux density on the axis of a ring-shaped, permanent magnet assembly in a center hole thereof and a distance from the center of the ring-shaped, permanent magnet assembly in an axial direction, with respect to a ring-shaped, permanent magnet assembly constituted by 8 permanent magnet segments in a peripheral direction and a ring-shaped, permanent magnet assembly constituted by 12 permanent magnet segments in a peripheral direction.
Figure 15:
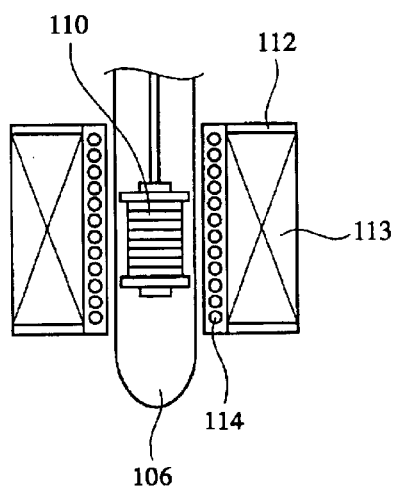
FIG. 15 is a schematic cross-sectional view showing a conventional heat-treating furnace with a magnetic field comprising an electromagnet.
Figure 16A:
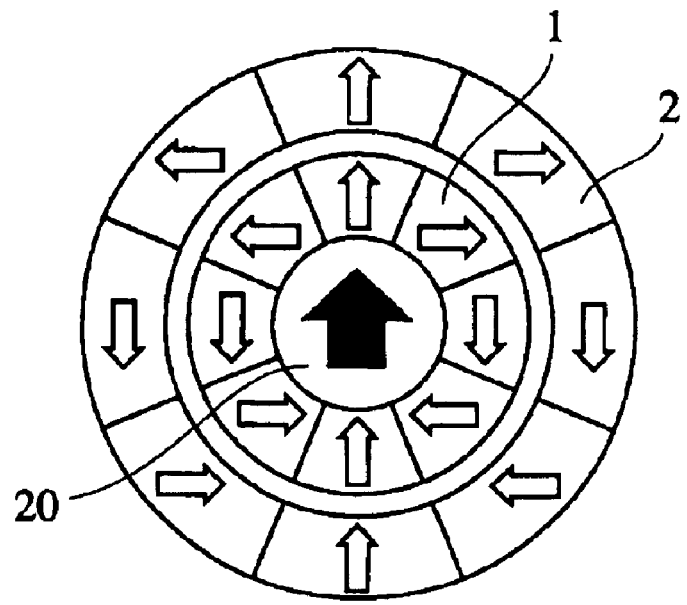
FIG. 16(a) is a schematic cross-sectional view showing a Halbach magnetic circuit, in which the magnetization direction of permanent magnet segments in an outer, ring-shaped, permanent magnet assembly is identical with the magnetization direction of permanent magnet segments in an inner, ring-shaped, permanent magnet assembly.
Figure 16B:
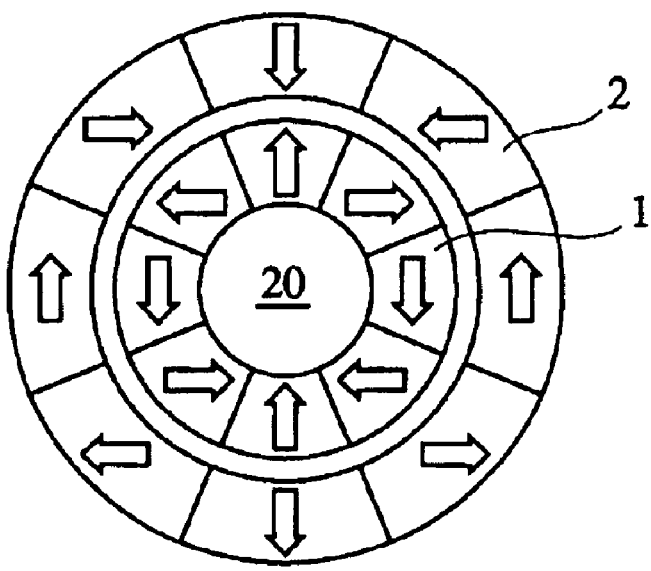
FIG. 16(b) is a schematic cross-sectional view showing a Halbach magnetic circuit, in which the magnetization direction of permanent magnet segments in an outer, ring-shaped, permanent magnet assembly is substantially opposite to the magnetization direction of permanent magnet segments in an inner, ring-shaped, permanent magnet assembly.

Each ring-shaped, permanent magnet assembly 1, 2 preferably comprises 8 or more permanent magnet segments in a periphery. With respect to a ring-shaped, permanent magnet assembly having an inner diameter of 120 mm and an outer diameter of 200 mm, a magnetic field (T) in its center hole was measured. FIG. 14 shows the relation between the axial length (mm) of the ring-shaped, permanent magnet assembly and a magnetic field (T) (magnetic flux density at a center of the center hole). It is clear from FIG. 14 that the magnetic field in the center hole 20 was about 5% larger when the number of permanent magnet segments in a periphery was 12 than when it was 8.

Though the term "heat treatment in a magnetic field" is used herein, it should be noted that this heat treatment may be called annealing.

Because a uniform parallel magnetic field can be applied to a plurality of articles to be heat-treated such as substrates with thin magnetic layers in the heat-treating furnace with a magnetic field of the present invention, the heat-treated substrates with thin magnetic layers have uniform and stable quality. It is also possible to control the strength of a magnetic field applied to articles to be heat-treated in the center hole. Because the heat-treating furnace with a magnetic field of the present invention suffers from only a small leaked magnetic field, there is no need of magnetic shield, thereby making the overall apparatus smaller. In addition, because electric power for generating a magnetic field is not needed, it is not only possible to reduce installation and operation cost, but there is also no problem of heat generation in a coil for generating a magnetic field.

Cooling water need only flow in an amount that does not cause the deterioration of the characteristics of permanent magnets by a heat treatment temperature, through the cooling means disposed in the center hole of the inner, ring-shaped, permanent magnet assembly. Therefore, the heat-treating furnace with a magnetic field of the present invention can be operated at a low cost.

What is claimed is:

1. A heat-treating furnace with a magnetic field comprising (a) a magnetic field-generating means constituted by one ring-shaped, permanent magnet assembly comprising a plurality of permanent magnet segments combined with their magnetization directions oriented such that a magnetic flux flows in a diameter direction, said permanent magnet segment being constituted by combining a plurality of permanent magnet pieces; and (b) a heat treatment means disposed in a center hole of said ring-shaped, permanent magnet assembly and comprising a cooling means, a heating means, and a heat-treating container for containing a heat-treating holder for holding a plurality of articles to be heat-treated in this order from outside, wherein said ring-shaped, permanent magnet assembly has an inner diameter of 120 mm or more, an outer diameter ($D_1$) of 300 mm or more, and an axial length (H) of 100 mm or more, and wherein the axial length H and the outer diameter $D_1$ of said ring-shaped, permanent magnet assembly meet the requirement of $2 \leq D_1/H \leq 10$.

2. The heat-treating furnace with a magnetic field according to claim 1, wherein said heat-treating container is a vacuum container.

3. The heat-treating furnace with a magnetic field according to claim 1, wherein said cooling means comprises a cooling pipe through which a cooling liquid flows, and a heat sink plate disposed outside said cooling pipe and inside said inner, ring-shaped, permanent magnet assembly.

4. The heat-treating furnace with a magnetic field according to claim 1, wherein an axial center of a magnetic field of said magnetic field-generating means is substantially identical with an axial center of an assembly of a plurality of articles to be heat-treated, which are held in said heat-treating container.

5. The heat-treating furnace with a magnetic field according to claim 1, wherein said ring-shaped, permanent magnet assembly has a shorter axial length as it goes outside in a radius direction.

6. The heat-treating furnace with a magnetic field according to claim 1, wherein each permanent magnet segment constituting said ring-shaped, permanent magnet assembly has a residual magnetic flux density of 1.1 T or more and coercivity of 1114 kA/m (14 kOe) or more.

7. A heat-treating furnace with a magnetic field comprising (a) a magnetic field-generating means constituted by an outer, ring-shaped, permanent magnet assembly comprising a plurality of permanent magnet segments combined with their magnetization directions oriented such that a magnetic flux flows in a diameter direction, and an inner, ring-shaped, permanent magnet assembly disposed inside said outer, ring-shaped, permanent magnet assembly and comprising a plurality of permanent magnet segments combined with their magnetization directions oriented such that a magnetic flux flows in a diameter direction, said permanent magnet segment being constituted by combining a plurality of permanent magnet pieces; and (b) a heat treatment means disposed in a center hole of said inner, ring-shaped, permanent magnet assembly and comprising a cooling means, a heating means, and a heat-treating container containing heat-treating holder for holding a plurality of articles to be heat-treated in this order from outside, wherein said inner, ring-shaped, permanent magnet assembly has an inner diameter of 120 mm or more, wherein said outer, ring-shaped, permanent magnet assembly has an outer diameter ($D_2$) of 300 mm or more, and wherein said inner, ring-shaped, permanent magnet assembly or said outer, ring-shaped, permanent magnet assembly has an axial length (H) of 100 mm or more, and wherein the axial length H of said inner, ring-shaped, permanent magnet assembly and the outer diameter $D_2$ of said outer, ring-shaped, permanent magnet assembly meet the requirement of $2 \leq D_2/H \leq 10$.

8. The heat-treating furnace with a magnetic field according to claim 7, wherein said heat-treating container is a vacuum container.

9. The heat-treating furnace with a magnetic field according to claim 7, wherein said cooling means comprises a cooling pipe through which a cooling liquid flows, and a heat sink plate disposed outside said cooling pipe and inside said inner, ring-shaped, permanent magnet assembly.

10. The heat-treating furnace with a magnetic field according to claim 7, wherein an axial center of a magnetic field of said magnetic field-generating means is substantially identical with an axial center of an assembly of a plurality of articles to be heat-treated, which are held in said heat-treating container.

11. The heat-treating furnace with a magnetic field according to claim 7, wherein the direction of said inner, ring-shaped, permanent magnet assembly to said articles to be heat-treated is not changeable, while said outer, ring-shaped, permanent magnet assembly is rotatable relative to said inner, ring-shaped, permanent magnet assembly.

12. The heat-treating furnace with a magnetic field according to claim 7, wherein said inner, ring-shaped, permanent magnet assembly and said outer, ring-shaped, permanent magnet assembly are rotatable relative to each other, so that a magnetic field in said center hole is changeable in a range of 0–2 T.

13. The heat-treating furnace with a magnetic field according to claim 1, wherein said inner, ring-shaped, permanent magnet assembly and said outer, ring-shaped, permanent magnet assembly have different axial lengths.

14. The heat-treating furnace with a magnetic field according to claim 1, wherein said inner, ring-shaped, permanent magnet assembly and/or said outer, ring-shaped, permanent magnet assembly have shorter axial length as it goes outside in a radius direction.

15. The heat-treating furnace with a magnetic field according to claim 1, wherein each permanent magnet segment constituting said outer, ring-shaped, permanent magnet assembly and said inner, ring-shaped, permanent magnet assembly has a residual magnetic flux density of 1.1 T or more and coercivity of 1114 kA/m (14 kOe) or more.

16. A method for heat-treating a plurality of articles at a time in a magnetic field, using a heat-treating furnace with a magnetic field comprising (a) a magnetic field-generating means constituted by an outer, ring-shaped, permanent magnet assembly comprising a plurality of permanent magnet segments combined with their magnetization directions oriented such that a magnetic flux flows in a diameter direction, and an inner, ring-shaped, permanent magnet assembly disposed inside said outer, ring-shaped, permanent magnet assembly and comprising a plurality of permanent magnet segments combined with their magnetization directions oriented such that a magnetic flux flows in a diameter direction, said permanent magnet segment being constituted by combining a plurality of permanent magnet pieces; and (b) a heat treatment means disposed in a center hole of said inner, ring-shaped, permanent magnet assembly and comprising a cooling means, a heating means, and a heat-treating container containing heat-treating holder for holding a plurality of articles to be heat-treated in this order from outside, said method comprising the steps of (1) introducing said heat-treating holder, on which a plurality of said articles to be heat-treated are placed, into said heat-treating container at a relative rotation position of said inner, ring-shaped, permanent magnet assembly and said outer, ring-shaped, permanent magnet assembly at which a radial magnetic field is substantially zero in said center hole; (2) heat-treating said articles in said heat-treating container by said heating means while cooling said magnetic field-generating means by said cooling means, in a state where a predetermined magnetic field is caused to exist in said center hole by rotating said outer, ring-shaped, permanent magnet assembly relative to said inner, ring-shaped, permanent magnet assembly; and (3) after the completion of heat-treating said articles, taking a plurality of heat-treated articles out of said heat-treating container at a relative rotation position of said inner, ring-shaped, permanent magnet assembly and said outer, ring-shaped, permanent magnet assembly at which a radial magnetic field is substantially zero in said center hole, wherein said inner, ring-shaped, permanent magnet assembly has an inner diameter of 120 mm or more, wherein said outer, ring-shaped, permanent magnet assembly has an outer diameter ($D_2$) of 300 mm or more, and wherein said inner, ring-shaped, permanent magnet assembly or said outer, ring-shaped, permanent magnet assembly has an axial length (H) of 100 mm or more, and wherein the axial length H of said inner, ring-shaped, permanent magnet assembly and the outer diameter $D_2$ of said outer, ring-shaped, permanent magnet assembly meet the requirement of $2 \leq D_2/H \leq 10$.

17. The method according to claim 16, wherein said article to be heat-treated is a wafer substrate having thin magnetic layer on the surface.

18. The method according to claim 16, wherein an assembly of said articles to be heat-treated is held in said heat-treating container, at a position at which an axial center of an assembly of a plurality of articles being heat-treated is substantially identical with an axial center of a magnetic field of said magnetic field-generating means.

19. The method according to claim 16, wherein said heat treatment is carried out when said heat-treating container is substantially in a vacuum state.

20. The method according to claim 16, wherein each permanent magnet segment constituting said outer, ring-shaped, permanent magnet assembly and said inner, ring-shaped, permanent magnet assembly has a residual magnetic flux density of 1.1 T or more and coercivity of 1114 kA/m (14 kOe) or more.

* * * * *